(12) United States Patent
Nagase

(10) Patent No.: US 8,993,160 B2
(45) Date of Patent: Mar. 31, 2015

(54) POSITIVE ELECTRODE FOR LITHIUM ION BATTERY, METHOD FOR PRODUCING SAID POSITIVE ELECTRODE, AND LITHIUM ION BATTERY

(75) Inventor: Ryuichi Nagase, Kitaibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 13/514,080

(22) PCT Filed: Dec. 3, 2010

(86) PCT No.: PCT/JP2010/071724
§ 371 (c)(1),
(2), (4) Date: Jun. 6, 2012

(87) PCT Pub. No.: WO2011/074431
PCT Pub. Date: Jun. 23, 2011

(65) Prior Publication Data
US 2012/0244434 A1 Sep. 27, 2012

(30) Foreign Application Priority Data
Dec. 18, 2009 (JP) .................... 2009-287556

(51) Int. Cl.
| | | |
|---|---|---|
| *H01M 4/13* | (2010.01) | |
| *H01M 4/131* | (2010.01) | |
| *H01M 4/62* | (2006.01) | |
| H01M 4/40 | (2006.01) | |
| H01M 4/46 | (2006.01) | |
| H01M 4/64 | (2006.01) | |
| H01M 4/36 | (2006.01) | |
| H01M 4/139 | (2010.01) | |
| H01M 4/1391 | (2010.01) | |
| H01M 4/70 | (2006.01) | |
| H01M 10/0525 | (2010.01) | |
| H01M 4/02 | (2006.01) | |

(52) U.S. Cl.
CPC .............. *H01M 4/13* (2013.01); *H01M 4/405* (2013.01); *H01M 4/46* (2013.01); *H01M 4/64* (2013.01); *H01M 4/364* (2013.01); *H01M 4/131* (2013.01); *H01M 4/139* (2013.01); *H01M 4/1391* (2013.01); *H01M 4/626* (2013.01); *H01M 4/70* (2013.01); *H01M 10/0525* (2013.01); *H01M 2004/028* (2013.01); *Y02E 60/122* (2013.01)
USPC ......................................... 429/211

(58) Field of Classification Search
CPC ............ H01M 4/0433; H01M 4/0416; H01M 2004/028; H01M 4/364; H01M 4/46; H01M 4/405; H01M 4/64
USPC ......................................... 429/211
See application file for complete search history.

(56) References Cited

U.S. PATENT DOCUMENTS

| | | | |
|---|---|---|---|
| 2,165,128 | A | 7/1939 | Cheesman |
| 4,443,186 | A | 4/1984 | Shell |
| 4,469,654 | A * | 9/1984 | Haskett et al. ................ 264/618 |
| 5,393,622 | A | 2/1995 | Nitta et al. |
| 5,478,674 | A | 12/1995 | Miyasaka |
| 6,037,095 | A | 3/2000 | Miyasaka |
| 6,123,911 | A | 9/2000 | Yamaguchi et al. |
| 6,423,447 | B1 | 7/2002 | Ohsaki et al. |
| 6,582,854 | B1 | 6/2003 | Qi et al. |
| 6,984,469 | B2 | 1/2006 | Kweon et al. |
| 7,410,728 | B1 | 8/2008 | Fujimoto et al. |
| 8,623,551 | B2 | 1/2014 | Kawahashi et al. |
| 8,748,041 | B2 | 6/2014 | Satoh et al. |
| 2002/0106561 | A1 * | 8/2002 | Lee et al. ................... 429/218.1 |
| 2003/0082448 | A1 | 5/2003 | Cho et al. |
| 2003/0211391 | A1 | 11/2003 | Cho et al. |
| 2004/0110063 | A1 | 6/2004 | Uchitomi et al. |
| 2004/0197658 | A1 | 10/2004 | Kase et al. |
| 2005/0079416 | A1 | 4/2005 | Ohzuku et al. |
| 2005/0142442 | A1 | 6/2005 | Yuasa et al. |
| 2005/0158546 | A1 | 7/2005 | Shizuka |
| 2006/0083989 | A1 | 4/2006 | Suhara et al. |
| 2006/0121350 | A1 | 6/2006 | Kajiya et al. |
| 2006/0127765 | A1 | 6/2006 | Machida et al. |
| 2006/0204849 | A1 | 9/2006 | Saito et al. |
| 2006/0233696 | A1 | 10/2006 | Paulsen et al. |
| 2006/0281005 | A1 | 12/2006 | Cho et al. |
| 2007/0015058 | A1 | 1/2007 | Takezawa et al. |
| 2007/0141469 | A1 | 6/2007 | Tokunaga et al. |

(Continued)

FOREIGN PATENT DOCUMENTS

| | | |
|---|---|---|
| CN | 1520621 A | 8/2004 |
| CN | 1701451 A | 11/2005 |
| CN | 1710735 A | 12/2005 |
| CN | 101478044 A | 7/2009 |
| EP | 0794155 A1 | 9/1997 |
| EP | 0903796 A1 | 3/1999 |
| EP | 1244164 A1 | 9/2002 |
| EP | 1391950 A1 | 2/2004 |
| EP | 1450423 A1 | 8/2004 |
| EP | 1742281 A1 | 1/2007 |

(Continued)

OTHER PUBLICATIONS

International Preliminary Report on Patentability mailed Nov. 22, 2012 in co-pending PCT application No. PCT/JP2011/054938.

(Continued)

*Primary Examiner* — Jane Rhee
(74) *Attorney, Agent, or Firm* — Nields, Lemack & Frame, LLC

(57) ABSTRACT

The present invention provides a positive electrode for lithium ion battery reducing a contact resistance of a battery and achieving an excellent output property. The positive electrode for lithium ion battery comprising a mixed layer comprising:
  metal forming a current collector, and
  positive electrode active material dispersed in a state of layer in the metal forming the current collector.

6 Claims, No Drawings

(56) References Cited

U.S. PATENT DOCUMENTS

| | | | |
|---|---|---|---|
| 2007/0202405 A1 | 8/2007 | Shizuka et al. | |
| 2007/0248883 A1 | 10/2007 | Oda et al. | |
| 2007/0298512 A1 | 12/2007 | Park et al. | |
| 2008/0044736 A1 | 2/2008 | Nakura | |
| 2008/0081258 A1* | 4/2008 | Kim et al. | 429/209 |
| 2009/0117464 A1 | 5/2009 | Cho et al. | |
| 2009/0117469 A1 | 5/2009 | Hiratsuka et al. | |
| 2009/0148772 A1 | 6/2009 | Kawasato et al. | |
| 2009/0233176 A1 | 9/2009 | Kita et al. | |
| 2009/0286164 A1 | 11/2009 | Wada et al. | |
| 2009/0289218 A1 | 11/2009 | Kajiya et al. | |
| 2009/0299922 A1 | 12/2009 | Malcus et al. | |
| 2009/0305136 A1 | 12/2009 | Yada et al. | |
| 2010/0015514 A1 | 1/2010 | Miyagi et al. | |
| 2010/0019194 A1 | 1/2010 | Fujiwara et al. | |
| 2010/0112447 A1 | 5/2010 | Yamamoto et al. | |
| 2010/0143583 A1 | 6/2010 | Honda et al. | |
| 2010/0183922 A1 | 7/2010 | Cho et al. | |
| 2010/0209757 A1 | 8/2010 | Ooyama et al. | |
| 2010/0209771 A1 | 8/2010 | Shizuka et al. | |
| 2011/0031437 A1 | 2/2011 | Nagase et al. | |
| 2011/0033749 A1 | 2/2011 | Uchida et al. | |
| 2011/0250499 A1 | 10/2011 | Hiratsuka | |
| 2012/0034525 A1 | 2/2012 | Satoh et al. | |
| 2012/0231342 A1 | 9/2012 | Satoh et al. | |
| 2012/0231343 A1 | 9/2012 | Nagase et al. | |
| 2012/0292562 A1 | 11/2012 | Kajiya et al. | |
| 2012/0319036 A1 | 12/2012 | Kajiya et al. | |
| 2012/0319037 A1 | 12/2012 | Kawahashi et al. | |
| 2012/0319039 A1 | 12/2012 | Satoh et al. | |
| 2012/0319040 A1 | 12/2012 | Okamoto et al. | |
| 2012/0321956 A1 | 12/2012 | Kawahashi et al. | |
| 2012/0326080 A1 | 12/2012 | Okamoto et al. | |
| 2012/0326098 A1 | 12/2012 | Satoh | |
| 2012/0326099 A1 | 12/2012 | Satoh | |
| 2012/0326101 A1 | 12/2012 | Satoh | |
| 2012/0326102 A1 | 12/2012 | Satoh | |
| 2013/0001463 A1 | 1/2013 | Okamoto et al. | |
| 2013/0004849 A1 | 1/2013 | Satoh | |
| 2013/0043428 A1 | 2/2013 | Kawahashi et al. | |
| 2013/0143121 A1 | 6/2013 | Kobayashi et al. | |
| 2013/0175470 A1 | 7/2013 | Kajiya et al. | |
| 2013/0221271 A1 | 8/2013 | Nagase et al. | |
| 2013/0316239 A1 | 11/2013 | Okamoto | |
| 2014/0306152 A1 | 10/2014 | Okamoto | |
| 2014/0339465 A1 | 11/2014 | Okamoto | |
| 2014/0339466 A1 | 11/2014 | Okamoto | |

FOREIGN PATENT DOCUMENTS

| | | |
|---|---|---|
| EP | 2023426 A1 | 2/2009 |
| EP | 2207226 A1 | 7/2010 |
| EP | 2207227 A1 | 7/2010 |
| EP | 2219251 A1 | 8/2010 |
| EP | 2533333 A1 | 12/2012 |
| JP | 4-328277 A | 11/1992 |
| JP | 7-29603 A | 1/1995 |
| JP | 7-211311 A | 8/1995 |
| JP | 8-138669 A | 5/1996 |
| JP | 09-82325 A | 3/1997 |
| JP | 9-120813 A | 5/1997 |
| JP | 10-83815 A | 3/1998 |
| JP | 10-116618 A | 5/1998 |
| JP | 10-188986 A | 7/1998 |
| JP | 10-206322 A | 8/1998 |
| JP | 10-208744 A | 8/1998 |
| JP | 10-302779 A | 11/1998 |
| JP | 10-321224 A | 12/1998 |
| JP | 11-67205 A | 3/1999 |
| JP | 11-273676 A | 10/1999 |
| JP | 11-292542 A | 10/1999 |
| JP | 11-307094 A | 11/1999 |
| JP | 11-345615 A | 12/1999 |
| JP | 2000-72445 A | 3/2000 |
| JP | 2000-149945 A | 5/2000 |
| JP | 2000-215884 A | 8/2000 |
| JP | 2000-348721 A | 12/2000 |
| JP | 2001-110420 A | 4/2001 |
| JP | 2001-148249 A | 5/2001 |
| JP | 2001-223008 A | 8/2001 |
| JP | 2001-266851 A | 9/2001 |
| JP | 2002-63901 A | 2/2002 |
| JP | 2002-164053 A | 6/2002 |
| JP | 2002-203552 A | 7/2002 |
| JP | 2002-216745 A | 8/2002 |
| JP | 2002-260655 A | 9/2002 |
| JP | 2002-298914 A | 10/2002 |
| JP | 3334179 B2 | 10/2002 |
| JP | 2003-7299 A | 1/2003 |
| JP | 2003-17052 A | 1/2003 |
| JP | 2003-81637 A | 3/2003 |
| JP | 2003-151546 A | 5/2003 |
| JP | 2004-6264 A | 1/2004 |
| JP | 2004-146374 A | 5/2004 |
| JP | 2004-172109 A | 6/2004 |
| JP | 2004-193115 A | 7/2004 |
| JP | 2004-214187 A | 7/2004 |
| JP | 2004-227790 A | 8/2004 |
| JP | 2004-273451 A | 9/2004 |
| JP | 2004-355824 A | 12/2004 |
| JP | 2004-356094 A | 12/2004 |
| JP | 2005-11713 A | 1/2005 |
| JP | 2005-53764 A | 3/2005 |
| JP | 2005-56602 A | 3/2005 |
| JP | 2005-60162 A | 3/2005 |
| JP | 2005-75691 A | 3/2005 |
| JP | 2005-183366 A | 7/2005 |
| JP | 2005-235624 A | 9/2005 |
| JP | 2005-243636 A | 9/2005 |
| JP | 2005-251700 A | 9/2005 |
| JP | 2005-285572 A | 10/2005 |
| JP | 2005-289700 A | 10/2005 |
| JP | 2005-302507 A | 10/2005 |
| JP | 2005-302628 A | 10/2005 |
| JP | 2005-324973 A | 11/2005 |
| JP | 2005-327644 A | 11/2005 |
| JP | 2005-332707 A | 12/2005 |
| JP | 2005-347134 A | 12/2005 |
| JP | 2006-4724 A | 1/2006 |
| JP | 2006-19310 A | 1/2006 |
| JP | 2006-54159 A | 2/2006 |
| JP | 2006-107818 A | 4/2006 |
| JP | 2006-107845 A | 4/2006 |
| JP | 2006-127923 A | 5/2006 |
| JP | 2006-127955 A | 5/2006 |
| JP | 2006-134816 A | 5/2006 |
| JP | 2006-134852 A | 5/2006 |
| JP | 2006-156126 A | 6/2006 |
| JP | 2006-156235 A | 6/2006 |
| JP | 2006-164758 A | 6/2006 |
| JP | 2006-286614 A | 10/2006 |
| JP | 3835266 B2 | 10/2006 |
| JP | 2006-302542 A | 11/2006 |
| JP | 2006-351379 A | 12/2006 |
| JP | 2007-48744 A | 2/2007 |
| JP | 2007-95443 A | 4/2007 |
| JP | 2007-194202 A | 8/2007 |
| JP | 2007-214138 A | 8/2007 |
| JP | 2007-226969 A | 9/2007 |
| JP | 2007-227368 A | 9/2007 |
| JP | 2007-257890 A | 10/2007 |
| JP | 2007-280723 A | 10/2007 |
| JP | 2008-13405 A | 1/2008 |
| JP | 4070585 B2 | 4/2008 |
| JP | 2008-103132 A | 5/2008 |
| JP | 2008-181708 A | 8/2008 |
| JP | 2008-192547 A | 8/2008 |
| JP | 2008-266136 A | 11/2008 |
| JP | 2008-277106 A | 11/2008 |
| JP | 4175026 B2 | 11/2008 |
| JP | 2008-544468 A | 12/2008 |
| JP | 2009-117365 A | 5/2009 |
| JP | 2009-135070 A | 6/2009 |

(56) References Cited

FOREIGN PATENT DOCUMENTS

| | | |
|---|---|---|
| JP | 2009-151959 A | 7/2009 |
| JP | 4287901 B2 | 7/2009 |
| JP | 2009-289726 A | 12/2009 |
| JP | 2010-15959 A | 1/2010 |
| JP | 2010-47466 A | 3/2010 |
| JP | 2010-192200 A | 9/2010 |
| JP | 2011-44364 A | 3/2011 |
| JP | 2012-169224 A | 9/2012 |
| JP | 2012-243572 A | 12/2012 |
| JP | 2013-152911 A | 8/2013 |
| KR | 10-2010-0060362 A | 6/2010 |
| TW | 363940 | 7/1999 |
| WO | 02/086993 A1 | 10/2002 |
| WO | 03/003489 A1 | 1/2003 |
| WO | 2004/064180 A1 | 7/2004 |
| WO | 2007/072759 A1 | 6/2007 |
| WO | 2008/084679 A1 | 7/2008 |
| WO | 2009/011157 A1 | 1/2009 |
| WO | 2009/060603 A1 | 5/2009 |
| WO | 2009/063838 A1 | 5/2009 |
| WO | 2009/128289 A1 | 10/2009 |
| WO | 2010/049977 A1 | 5/2010 |
| WO | 2010/113512 A1 | 10/2010 |
| WO | 2010/113583 A1 | 10/2010 |
| WO | 2011/007751 A1 | 1/2011 |
| WO | 2011/065391 A1 | 6/2011 |
| WO | 2011/108720 A1 | 9/2011 |
| WO | 2012/098724 A1 | 7/2012 |
| WO | 2012/132071 A1 | 10/2012 |
| WO | 2012/132072 A1 | 10/2012 |
| WO | 2012/157143 A1 | 11/2012 |

OTHER PUBLICATIONS

International Preliminary Report on Patentability mailed Nov. 22, 2012 in co-pending PCT application No. PCT/JP2011/055111.
International Search Report mailed Nov. 1, 2011 in co-pending PCT application No. PCT/JP2011/066722.
International Search Report mailed Apr. 10, 2012 in co-pending PCT application No. PCT/JP2011/079535.
Office Action-Restriction-mailed Mar. 12, 2013 in co-pending U.S. Appl. No. 13/508,887.
Office Action mailed Mar. 13, 2013 in co-pending U.S. Appl. No. 13/582,091.
International Search Report mailed Jun. 8, 2010 in co-pending PCT application No. PCT/JP2010/053443.
International Preliminary Report on Patentability mailed Nov. 17, 2011 in co-pending PCT application No. PCT/JP2010/053443.
International Search Report mailed May 24, 2011 in co-pending PCT application No. PCT/JP2011/053271.
International Search Report/Written Opinion Mar. 8, 2011 in co-pending PCT application No. PCT/JP2010/071723.
International Preliminary Report on Patentability mailed Jul. 12, 2012 in co-pending PCT application No. PCT/JP2010/071723.
International Search Report/Written Opinion mailed Jan. 25, 2011 in corresponding PCT application No. PCT/JP2010/071724.
International Preliminary Report on Patentability issued Jul. 10, 2012 in corresponding PCT application No. PCT/JP2010/071724.
International Search Report mailed Jan. 24, 2012 in co-pending PCT application No. PCT/JP2011/072860.
International Search Report mailed Apr. 26, 2011 in co-pending PCT application No. PCT/JP2011/052394.
International Preliminary Report on Patentability mailed Oct. 11, 2012 in co-pending PCT application No. PCT/JP2011/052394.
International Search Report mailed May 10, 2011 in co-pending PCT application No. PCT/JP2011/052399.
International Preliminary Report on Patentability mailed Oct. 11, 2012 in co-pending PCT application No. PCT/JP2011/052399.
International Search Report mailed Nov. 15, 2011 in co-pending PCT application No. PCT/JP2011/069042.
International Search Report/Written Opinion mailed Jun. 7, 2011 in co-pending PCT application No. PCT/JP2011/054935.
International Preliminary Report on Patentability mailed Oct. 11, 2012 in co-pending PCT application No. PCT/JP2011/054935.
International Search Report mailed Jun. 7, 2011 in co-pending PCT application No. PCT/JP2011/054938.
International Search Report/Written Opinion mailed May 17, 2011 in co-pending PCT application No. PCT/JP2011/054942.
International Preliminary Report on Patentability issued Oct. 2, 2012 in co-pending PCT application No. PCT/JP2011/054942.
International Search Report/Written Opinion mailed Jun. 7, 2011 in co-pending PCT application No. PCT/JP2011/054934.
International Preliminary Report on Patentability mailed Oct. 11, 2012 in co-pending PCT application No. PCT/JP2011/054934.
International Search Report/Written Opinion mailed May 17, 2011 in co-pending PCT application No. PCT/JP2011/054941.
International Preliminary Report on Patentability issued Oct. 2, 2012 in co-pending PCT application No. PCT/JP2011/054941.
International Search Report mailed May 10, 2011 in co-pending PCT application No. PCT/JP2011/055111.
International Search Report/Written Opinion mailed May 17, 2011 in co-pending PCT application No. PCT/JP2011/053710.
International Preliminary Report on Patentability issued Oct. 2, 2012 in co-pending PCT application No. PCT/JP2011/053710.
International Search Report/Written Opinion mailed May 24, 2011 in co-pending PCT application No. PCT/JP2011/054777.
International Preliminary Report on Patentability issued Oct. 2, 2012 in co-pending PCT application No. PCT/JP2011/054777.
International Search Report mailed May 24, 2011 in co-pending PCT application No. PCT/JP2011/054781.
Written Opinion mailed Jun. 24, 2011 in co-pending PCT application No. PCT/JP2011/054781.
International Preliminary Report on Patentability mailed Oct. 11, 2012 in co-pending PCT application No. PCT/JP2011/054781.
International Search Report/Written Opinion mailed May 24, 2011 in co-pending PCT application No. PCT/JP2011/054779.
International Preliminary Report on Patentability issued Oct. 2, 2012 in co-pending PCT application No. PCT/JP2011/054779.
Electrochimica Acta, vol. 51, 2006, pp. 5581-5586, "Preparation and electrochemical properties of LiCoO2—LiNi0.5Mn0.5O2—Li2MnO3 solid solutions with high Mn contents", Sun, et al.
Office Action mailed Jun. 10, 2013 in co-pending U.S. Appl. No. 13/508,887.
Office Action mailed Jul. 29, 2013 in co-pending U.S. Appl. No. 13/576,548.
Office Action mailed Aug. 1, 2013 in co-pending U.S. Appl. No. 13/581,546.
Office Action mailed Jul. 17, 2013 in co-pending U.S. Appl. No. 13/581,814.
Office Action mailed Jun. 19, 2013 in co-pending U.S. Appl. No. 13/582,096.
Office Action mailed Jul. 12, 2013 in co-pending U.S. Appl. No. 13/582,101.
Office Action mailed Jul. 15, 2013 in co-pending U.S. Appl. No. 13/582,113.
Office Action mailed Aug. 13, 2013 in co-pending U.S. Appl. No. 13/582,067.
International Preliminary Report on Patentability mailed Oct. 10, 2013 in co-pending PCT application No. PCT/JP0212/057974.
Office Action mailed Dec. 4, 2013 in co-pending U.S. Appl. No. 13/508,880.
Final Rejection mailed Jan. 9, 2014 in co-pending U.S. Appl. No. 13/576,548.
Notice of Allowance mailed Nov. 6, 2013 in U.S. Appl. No. 13/582,091 (now US Patent No. 8,623,551.
Int. J. Electrochem. Sci., vol. 4, 2009, pp. 1770-1778, "Improved High Rate Cycling of Li-rich Li(1.10)Ni(1/3)Co(1/3)Mn(1/3)O(2) Cathode for Lithium Batteries", Santhanam, et al.
Notice of Allowance mailed Mar. 20, 2014 in co-pending U.S. Appl. No. 13/258,120.
Final Rejection mailed Feb. 27, 2014 in co-pending U.S. Appl. No. 13/856,514.
Final Rejection mailed Jan. 27, 2014 in co-pending U.S. Appl. No. 13/581,546.

(56) References Cited

OTHER PUBLICATIONS

Final Rejection mailed Jan. 24, 2014 in co-pending U.S. Appl. No. 13/582,067.
Final Rejection mailed Jan. 27, 2014 in co-pending U.S. Appl. No. 13/581,814.
Final Rejection mailed Feb. 20, 2014 in co-pending U.S. Appl. No. 13/582,096.
Final Rejection mailed Feb. 7, 2014 in co-pending U.S. Appl. No. 13/582,101.
Final Rejection mailed Feb. 18, 2014 in co-pending U.S. Appl. No. 13/582,113.
European communication issued May 9, 2014 in co-pending European patent application No. EP 11739870.1.
European communication issued May 9, 2014 in co-pending European patent application No. EP 11750704.6.
Chinese communication dated May 12, 2014 in co-pending Chinese patent application No. CN 201180008573.3.
European communication issued May 22, 2014 in co-pending European patent application No. EP 11750705.3.
European communication issued May 6, 2014 in co-pending European patent application No. EP 11845955.1.
International Search Report mailed Dec. 25, 2012 in co-pending PCT application No. PCT/JP2012/074263.
International Search Report mailed Dec. 25, 2012 in co-pending PCT application No. PCT/JP2012/074266.
International Search Report mailed Aug. 27, 2013 in co-pending PCT application No. PCT/JP2013/064941.
Final Rejection mailed Jun. 18, 2014 in co-pending U.S. Appl. No. 13/508,880.
Office Action mailed Jul. 1, 2014 in co-pending U.S. Appl. No. 13/576,548.
Office Action mailed Jul. 8, 2014 in co-pending U.S. Appl. No. 13/576,753.
International Preliminary Report on Patentability mailed Sep. 26, 2013 in co-pending PCT application No. PCT/JP2011/053271.
International Preliminary Report on Patentability mailed Oct. 10, 2013 in co-pending PCT application No. PCT/JP2011/072860.
International Preliminary Report on Patentability mailed Aug. 1, 2013 in co-pending PCT application No. PCT/JP2011/069042.
Japanese Communication mailed Oct. 1, 2013 in co-pending Japanese patent application No. JP 2012-503253.
Japanese Communication mailed Oct. 1, 2013 in co-pending Japanese patent application No. JP 2012-503255.
Japanese Communication mailed Oct. 1, 2013 in co-pending Japanese patent application No. JP 2012-503252.
International Preliminary Report on Patentability mailed Jun. 13, 2013 in co-pending PCT application No. PCT/JP2011/066722.
International Search Report mailed Jun. 5, 2012 in co-pending PCT application No. PCT/JP2012/057974.
International Journal of Inorganic Materials 3 (2001), pp. 323-329, "Structural and electrochemical properties of Li—Ni—Co oxides synthesized by wet chemistry via a succinic-acid-assisted technique", Castro-Garcia, et al.
Office Action mailed Oct. 3, 2013 in co-pending U.S. Appl. No. 13/258,120.
Final Rejection mailed Sep. 19, 2013 in co-pending U.S. Appl. No. 13/508,887.
Office Action mailed Sep. 17, 2013 in co-pending U.S. Appl. No. 13/856,514.
International Preliminary Report on Patentability mailed Jul. 31, 2014 in co-pending PCT application No. PCT/JP2012/074263.
International Preliminary Report on Patentability mailed Jul. 31, 2014 in co-pending PCT application No. PCT/JP2012/074266.
Journal of the Electrochemical Society, 151 (11), 2004, pp. A1899-A1904, "Synthesis, Thermal, and Electrochemical Properties of AlPO4-Coated LiNi0.8Co0.1Mn0.1O2 Cathode Materials for Li-Ion Cell", Cho, et al.
Journal of the Electrochemical Society, 155 (3), 2008, pp. A239-A245, "Storage Characteristics of LiNi0.8Co0.1+xMn0.1-xO2 (x=0, 0.03, and 0.06) Cathode Materials for Lithium Ion Batteries", EOM, et al.
Machine English translation for CN 1710735 (2005), 9 pages, European Patent Office, http://translationportal.epo.org . . . , retrieved from the internet Oct. 6, 2014.
Final Rejection mailed Sep. 18, 2014 in co-pending U.S. Appl. No. 13/508,887.
Office Action mailed Sep. 18, 2014 in co-pending U.S. Appl. No. 13/856,514.
Office Action mailed Oct. 9, 2014 in co-pending U.S. Appl. No. 13/695,663.
Office Action mailed Oct. 2, 2014 in co-pending U.S. Appl. No. 13/582,089.
Office Action mailed Oct. 3, 2014 in co-pending U.S. Appl. No. 13/581,730.
European communication dated Nov. 5, 2014 in co-pending European patent application No. EP 11856183.6.
European communication dated Oct. 27, 2014 in co-pending European patent application No. EP 10839166.5.
European communication dated Oct. 20, 2014 in co-pending European patent application No. EP 12763420.2.
Office Action mailed Nov. 5, 2014 in co-pending U.S. Appl. No. 13/582,087.
Office Action mailed Nov. 14, 2014 in co-pending U.S. Appl. No. 13/582,096.

\* cited by examiner

POSITIVE ELECTRODE FOR LITHIUM ION BATTERY, METHOD FOR PRODUCING SAID POSITIVE ELECTRODE, AND LITHIUM ION BATTERY

TECHNICAL FIELD OF THE INVENTION

The present invention relates to a positive electrode for lithium ion battery, a method for producing said positive electrode, and a lithium ion battery.

BACKGROUND OF THE INVENTION

In general, lithium-containing transition metal oxides are used for a positive electrode active material for lithium ion battery. In particular, they are lithium cobaltate ($LiCoO_2$), lithium nickelate ($LiNiO_2$), lithium manganite ($LiMn_2O_4$) and the like. A combination of the lithium-containing transition metal oxides is proceeding in order to improve properties such as high capacity, cycle characteristic, storage characteristic, decreased internal resistance, rate performance, and safety. Specifically, lithium ion batteries, for large-size equipment use such as automobile use and load leveling use, require properties different from those of mobile phone use and mobile computer use. In particular, high capacity and low resistance are required for automobile use and high capacity and long lifetime are required for load leveling use.

Traditionally, the positive electrode for lithium ion battery is produced in a manner such that positive electrode active material and conductive material are mixed in organic solvent where binder dissolves, paste thereof is formed, the paste is coated on an aluminum foil, and then drying operation and pressing operation are conducted. The binder is necessary for maintaining adhesion between the positive electrode active material, the conductive material and the aluminum foil (current collector). Further, the conductive material is mixed in order to provide conductive property with the positive electrode active material which is poor at conductive property.

For example, such positive electrodes for lithium ion battery are disclosed in Patent documents 1 to 3. In these active materials, the positive electrode for lithium ion battery disclosed in Patent document 1 is produced in a manner such that paste of positive electrode active material is coated on an aluminum foil for a current collector where hydration and oxidation treatments are conducted on a surface. Further, the positive electrode active material paste used here includes positive electrode active material, conductive material such as carbon black and graphite, binder such as PTFE and solvent such as water (paragraphs 0016 to 0025 in the specification of Patent document 1).

Further, Patent document 2 discloses a positive electrode for lithium ion battery of an aluminum foil comprising a film containing compounds having ion permeability and carbon particulates as a lower layer, and a film containing binder, carbon particulates and positive electrode active material as a upper layer (paragraph 0009 and the like in the specification of Patent document 2).

Further, a positive electrode for lithium ion battery disclosed in Patent document 3 is produced in a manner such that positive electrode active material composition is coated on Al alloy positive electrode current collector. The positive electrode active material composition used here is produced in a manner such that positive electrode active material, polyvinylidene fluoride binder and carbon conductive material are dispersed in a solvent of N-methyl pyrrolidone (paragraphs 0031 and 0032 and the like in the specification of Patent document 3).

(Patent document 1) Japanese Patent Application Publication No. 2008-103132
(Patent document 1) Japanese Patent Application Publication No. 2007-226969
(Patent document 1) Japanese Patent Application Publication No. 2005-243636

SUMMARY OF THE INVENTION

However, when the positive electrode for lithium ion battery is produced in a manner such that positive electrode active material mixed with conductive material, binder and the like is coated on a current collector such as aluminum foil, uneven distribution of conductive material, deactivation caused by covering of the binder over the positive electrode active material and the like are generated, and then a contact resistance of battery increases. Therefore, a problem that an output property of the battery deteriorates can be caused.

The present invention aims to provide a positive electrode for lithium ion battery reducing a contact resistance of a battery and achieving an excellent output property. Further, the present invention aims to provide a method for producing the positive electrode for lithium ion battery. Furthermore, the present invention aims to provide a lithium ion battery using the positive electrode for lithium ion battery.

The inventor has focused attention on a conductive property of the positive electrode active material and the aluminum foil of the current collector, and a method for bonding them, and diligently studied and eventually have found out, a positive electrode for lithium ion battery, using positive electrode active material including no conductive material and no binder, having non-traditional structure and properties, can be produced.

The present invention, produced on the basis of the above findings, in one aspect, is a positive electrode for lithium ion battery comprising a mixed layer comprising:
  metal forming a current collector, and
  positive electrode active material dispersed in a state of layer in the metal forming the current collector.

The present invention is, in one embodiment, the positive electrode for lithium ion battery, further comprising a layer of only the metal, where the mixed layer is formed on the layer of only the metal.

The present invention is, in another embodiment, the positive electrode for lithium ion battery, where the metal is aluminum or aluminum alloy.

The present invention is, in yet another embodiment, the positive electrode for lithium ion battery, where the positive electrode active material is a lithium-containing transition metal oxide.

The present invention is, in yet another embodiment, the positive electrode for lithium ion battery, where the transition metal in the lithium-containing transition metal oxide is one or more selected from the group consisting of Ni, Mn, Co and Fe.

The present invention is, in yet another embodiment, the positive electrode for lithium ion battery, where a crystal structure of the positive electrode active material has a layer structure or a spinel structure.

The present invention is, in another aspect, a method for producing a positive electrode for lithium ion battery, comprising a step of setting powder of positive electrode active material in a mold and casting molten metal on the powder in the mold.

The present invention is, in yet another aspect, a lithium ion battery using the positive electrode for lithium ion battery of the present invention.

Advantageous Effect of the Invention

The present invention can provide a positive electrode for lithium ion battery reducing a contact resistance of a battery and achieving an excellent output property.

DESCRIPTION OF THE PREFERRED EMBODIMENTS

Structure of Positive Electrode for Lithium Ion Battery

The positive electrode for lithium ion battery of an embodiment of the present invention comprises a mixed layer comprising metal forming a current collector, and positive electrode active material dispersed in a state of layer in the metal forming the current collector. The mixed layer may compose the positive electrode singularly. Further, the mixed layer may be formed on a metal layer forming a current collector, and these two layers may compose the positive electrode.

As raw materials for positive electrode active material for lithium ion battery, without being limited particularly, various compounds useful for positive electrode active material for general positive electrode for lithium ion battery can be used. In particular, it is preferable to use lithium-containing transition metal oxides such as lithium cobaltate ($LiCoO_2$), lithium nickelate ($LiNiO_2$) and lithium manganate ($LiMn_2O_4$). The transition metal in the lithium-containing transition metal oxide is preferably one or more selected from the group consisting of Ni, Mn, Co and Fe. The lithium ratio to all metals in the lithium-containing transition metal oxide is over 1.0 to below 1.3. This is because it is difficult to maintain stable crystal structure if the ratio is 1.0 or less, and high capacity of the battery cannot be secured if the ratio is 1.3 or more. A crystal structure of the positive electrode active material in such a mixed layer is not limited as long as lithium can be inserted to and removed from, but a layer structure or a spinel structure is preferable.

The current collector is formed with a conductive material, consisting of metal having excellent conductive property. The conductive material is, as described below, cast on the powder of the positive electrode active material after melted in a production process of the positive electrode. Therefore, the conductive material, in which a melting point of the conductive material is a temperature such that negatively affects a property of the positive electrode active material, is not preferable. Further, it is necessary for the conductive material to be a metal having greater ionization tendency than a metal element composing the positive electrode active material. Accordingly, as conductive materials composing the current collector, aluminum, magnesium, manganese, zinc, or an alloy comprising at least one species thereof may be used, and aluminum and aluminum alloy (for example, Al—Mn series, Al—Mg series, Al—Zn—Mg series) are especially preferable among them. Further, a configuration of the current collector is not limited in particular, and it may be in the form of foils, plates and the like.

The mixed layer is, as described below, a mixed layer of positive electrode active material and metal composing the current collector, formed in a manner such that positive electrode active material in powder form is bedded in a mold, molten metal to be constituent material of the current collector is poured on the positive electrode active material, and then they are solidified. Accordingly, the mixed layer has a structure where the metal gets through the interval between particles of the positive electrode active material and becomes solid. Further, the positive electrode active material in the mixed layer is dispersed in layers in the metal composing the current collector. The positive electrode active material dispersed in layers is not limited, but it is preferably dispersed evenly.

The positive electrode for lithium ion battery of the embodiment of the present invention, as described above, comprises the mixed layer of the positive electrode active material and the metal composing the current collector. Accordingly, the positive electrode active material has an excellent adhesion property with the current collector and an excellent conductive property even though binder or conductive material is not included.

The mixed layer has a thickness of, for example, 10 μm to 60 μm, though it differs according to a size of the positive electrode to be formed, an average particle size of the positive electrode active material powder, a hardness of the surface of the positive electrode active material bedded on the mold, materials, amount and temperature of the molten metal to be poured, and the like.

A composition of the mixed layer can be determined by a quantitative analysis of each element of the materials (Li, Ni, Mn and the like) with ICP-MS (ICP mass spectroscope). Further, the thickness of the mixed layer can be determined by an observation with SEM (scanning electron microscope).

[Manufacturing Method for Positive Electrode for Lithium Ion Battery]

Next, manufacturing method for positive electrode for lithium ion battery of the embodiment of the present invention is explained.

First, powder of the positive electrode active material is formed. The present invention can use a method to oxidize a mixture or a coprecipitate containing metal composing the positive electrode active material for forming the positive electrode active material powder. The mixture can be formed by mixing compounds of each element with a general method, and the coprecipitate can be formed with a general method (coprecipitation with hydroxide or carbonate).

In particular, firstly, raw materials of various types are mixed in a manner such that metal elements composing crystals of the positive electrode active material exist in the crystal structure at an intended composition ratio, and then they are defined as raw material mixtures. The raw material includes a lithium compound and compounds of other metal elements.

Examples of the lithium compound may include, but not limited to, lithium carbonate, lithium hydroxide, lithium oxide, lithium chloride, lithium nitrate, lithium sulfate, lithium hydrogen carbonate, lithium acetate, lithium fluoride, lithium bromide, lithium iodide and lithium peroxide. Above all, lithium carbonate is preferable because it is easy to handle and it is inexpensive.

When Ni, Mn, Co, Mg, Al, Ti, Cr, Fe, Cu or Zr is employed as other metal elements contained in the positive electrode active material, carbonate, nitrate, hydroxide, chloride, oxide and the like, of the metal elements, can be used as the raw materials in a similar way.

The mixing method will be explained. The mixing method may include, but not limited to, a method where powdered raw materials are directly mixed, a method where raw materials are mixed after dissolved or suspended in water and/or organic solvent.

Next, an oxidation treatment (for example, calcination under oxidation atmosphere) is conducted to provided raw material mixture under an appropriate condition and then the powder of the positive electrode active material of the present invention can be provided.

Further, an averaged particle size of the powder of the positive electrode active material to be used is preferably not greater than 10 μm though it depends on properties required for the battery. It is because, in the case that the averaged particle size is not greater than 10 μm, the molten metal substantially can mix with the powder of the positive electrode active material when the molten metal is poured. It is also because properties required for the battery can be largely satisfactory.

Next, a mold is prepared and the powder of the positive electrode active material is evenly bedded in the mold. A configuration and a size of the mold are not limited. Further, constituent material of the mold can include, but not limited to, for example, cast iron, copper alloy, aluminum alloy, steel, other special alloy and the like.

Next, the molten metal as a constituent material of the current collector is poured on the powder in the mold. At this time, when, for example, aluminum is used as the molten metal, it does not negatively affect properties of the positive electrode active material because its melting point is 660° C. The poured molten metal goes into the powder of the positive electrode active material in the mold. In this way, the molten metal mixes with the positive electrode active material and the mixed layer in which the positive electrode active material is dispersed in a state of layer is formed. Further, a part of the molten metal may be formed to overlap on the mixed layer.

Next, a mixture composed of the positive electrode active material and the molten metal is solidified to form a mixed layer by cooling the positive electrode active material and the molten metal in the mold, and then the positive electrode for lithium ion battery having the mixed layer is formed. Further, in the case as described above that a part of the molten metal is formed to overlap on the mixture, a layer of metal only, forming the current collector, is additionally formed on the mixed layer.

The lithium ion battery can be produced by using thus obtained positive electrode for lithium ion battery according to publicly known means.

The positive electrode for lithium ion battery of the present invention is, as described above, produced in a manner such that powdered positive electrode active material is set in the mold and the molten metal is poured on the material. Accordingly, it does not include conductive materials or binders. Thus, the contact resistance of the battery is reduced and the output property becomes excellent. Therefore, it is particularly useful for large-scale use such as automobile use and load leveling use in which high capacity, low resistance and long lifetime are required.

EXAMPLES

Examples of the present invention will be provided as follows for better understanding of the present invention and its advantages, but the following examples are intended to be non-limiting to the present invention.

Working Examples

Carbonate which is a precursor was formed by wet coprecipitation method using solution of nitrate of Ni, Mn and Co and lithium carbonate. After drying this, powder of positive electrode active material was formed by conducting a oxidation treatment. Contained amounts of Li, Ni, Mn and Co in the powder of the positive electrode active material was measured with ICP-MS, and it was determined that Ni:Mn:Co was 1:1:1 and a ratio of Li and all metals (Li/all metals ratio) was 1.05. Further, by the measurement with XRD (X-ray diffractometer), it was determined that the positive electrode active material had a layer structure. Further, by the measurement with laser diffraction particle size distribution, it was determined that the average particle size of the positive electrode active material was 6 μm.

The powder of the positive electrode active material was dispersed evenly on the bottom of the mold being set on the level and having the thickness of 100 μm. Next, melted aluminum was poured on the powder in the mold, and then cooled to produce the positive electrode for lithium ion battery.

Comparative Examples

As comparative examples, the same positive electrode active material as used in the working examples was formed. Next, carbon black as conductive material and PVDF as binder were prepared. Next, the positive electrode active material, the conductive material and the binder were weighed at the ratio of 85:8:7. Subsequently, the positive electrode active material and the conductive material were mixed in organic solvent (N-methyl pyrrolidone) where the binder dissolved, paste thereof was formed, the paste was coated on an aluminum foil as the current collector, and then drying operation and pressing operation were conducted. In this way, the positive electrode for lithium ion battery was produced. A thickness of the positive electrode was just about 100 μm.

A 2032 coin cell for use in evaluation, in which Li was used as a counter electrode, was prepared with using the positive electrode for lithium ion battery of working example and comparative example. With a solution obtained by dissolving 1M-LiPF6 in EC-DMC (1:1) as an electrolytic solution, the charge and discharge operation was conducted under the charge condition of 4.3V and the discharge condition of 3.0V. A resistance was estimated by a voltage reduction between ending of the charge and beginning of the discharge. As a result, the electrode resistance of working example was 0.5 mΩ and the electrode resistance of comparative example was 1.3 mΩ. This shows that a contact resistance of the battery using the positive electrode for lithium ion battery produced by the producing method of the present invention (working example) is less than that of the battery using the positive electrode for lithium ion battery produced by the traditional coating method (comparative example). Therefore, it is found that, if the positive electrode for lithium ion battery of the present invention is used, the contact resistance of the battery is reduced and the output property becomes excellent.

What is claimed is:

1. A positive electrode for lithium ion battery comprising:
   a mixed layer comprising:
      metal forming a current collector, and
      positive electrode active material dispersed in a state of layer in the metal forming the current collector; and
   a layer of only the metal, wherein the mixed layer is formed on the layer of only the metal.

2. The positive electrode for lithium ion battery of claim 1, wherein the metal is aluminum or aluminum alloy.

3. The positive electrode for lithium ion battery of claim 1, wherein the positive electrode active material is a lithium-containing transition metal oxide.

4. The positive electrode for lithium ion battery of claim 3, wherein the transition metal in the lithium-containing transition metal oxide is one or more selected from the group consisting of Ni, Mn, Co and Fe.

5. The positive electrode for lithium ion battery of claim 1, wherein a crystal structure of the positive electrode active material has a layer structure or a spinel structure.

6. A lithium ion battery comprising the positive electrode for lithium ion battery of claim 1.

* * * * *